United States Patent
Geisler

(10) Patent No.: US 7,627,962 B2
(45) Date of Patent: Dec. 8, 2009

(54) FLEXIBLE ANTI-NAIL PROTECTIVE FOOTWEAR, FLEXIBLE ANTI-NAIL PROTECTIVE CLOTHING ARTICLE, AND METHODS FOR MANUFACTURING THE SAME

(75) Inventor: Peter Geisler, Örebro (SE)

(73) Assignee: Arbesko AB, Orebro (SE)

( * ) Notice: Subject to any disclaimer, the term of this patent is extended or adjusted under 35 U.S.C. 154(b) by 315 days.

(21) Appl. No.: 11/388,207

(22) Filed: Mar. 24, 2006

(65) Prior Publication Data

US 2006/0265909 A1 Nov. 30, 2006

Related U.S. Application Data

(63) Continuation-in-part of application No. 10/433,430, filed as application No. PCT/SE01/02831 on Dec. 19, 2001, now abandoned.

(30) Foreign Application Priority Data

Dec. 20, 2000 (SE) ..................................... 0004725

(51) Int. Cl.
*A43B 13/22* (2006.01)
(52) U.S. Cl. .............................. 36/73; 36/107; 36/75 R; 36/30 R
(58) Field of Classification Search ...................... 36/73, 36/107, 75 R, 30 R
See application file for complete search history.

(56) References Cited

U.S. PATENT DOCUMENTS

| 1,701,611 | A | | 2/1929 | Glidden et al. |
| 3,835,558 | A | * | 9/1974 | Revill ............................. 36/44 |
| 4,098,943 | A | | 7/1978 | Degginger et al. |
| 4,443,507 | A | | 4/1984 | Yamada et al. |
| 4,524,529 | A | * | 6/1985 | Schaefer ......................... 36/98 |
| 4,651,445 | A | * | 3/1987 | Hannibal ....................... 36/103 |
| 5,390,430 | A | * | 2/1995 | Fitchmun et al. ............ 36/30 R |
| 5,843,851 | A | * | 12/1998 | Cochran ....................... 442/63 |
| 5,979,081 | A | | 11/1999 | Vaz |
| 6,021,524 | A | | 2/2000 | Wu et al. |
| 6,167,639 | B1 | * | 1/2001 | Ventura ........................... 36/44 |
| 7,401,421 | B2 | * | 7/2008 | Brennan ...................... 36/30 R |
| 2005/0132614 | A1 | * | 6/2005 | Brennan ......................... 36/73 |
| 2006/0021257 | A1 | * | 2/2006 | Hung ............................. 36/73 |

FOREIGN PATENT DOCUMENTS

| DE | 33 18 181 A1 | 11/1984 |
| DE | 42 14 802 A1 | 11/1993 |
| WO | WO 99/13744 | 3/1999 |

OTHER PUBLICATIONS

Office Action from corresponding EP Application No. 01 271 158.6, dated Oct. 29, 2004.

* cited by examiner

*Primary Examiner*—Marie Patterson
(74) *Attorney, Agent, or Firm*—Harness, Dickey & Pierce

(57) ABSTRACT

A flexible anti-nail protective footwear, which prevents injuries caused by pointed objects penetrating from below, comprises an upper part which is closed at its lower portion; a flexible outsole attached to the upper part; and a flexible anti-nail protective layer comprising a felted layer of polymer fibers, in which felted layer the polymer fibers are present in a non-woven condition. The flexible anti-nail protective layer is arranged in between the upper part and the flexible outsole or within the flexible outsole.

28 Claims, 1 Drawing Sheet

FLEXIBLE ANTI-NAIL PROTECTIVE FOOTWEAR, FLEXIBLE ANTI-NAIL PROTECTIVE CLOTHING ARTICLE, AND METHODS FOR MANUFACTURING THE SAME

PRIORITY STATEMENT

This application is a continuation-in-part of U.S. application Ser. No. 10/433,430, filed Jun. 4, 2003, now abandoned the entire contents of which are hereby incorporated by reference in their entirety, which claims the benefit under 35 U.S.C. § 371 of International Application No. PCT/SE01/02831, filed Dec. 19, 2001, which claims priority from Swedish Application No. 0004725-8, filed Dec. 20, 2000.

FIELD OF THE INVENTION

The present invention relates to flexible anti-nail protective footwear, and flexible anti-nail protective clothing articles, which prevent injuries caused by pointed objects penetrating from below, and methods for manufacturing the same

BACKGROUND OF THE INVENTION

In many situations, there is a need for protective layers which can be integrated into various body-protecting products in order to prevent injuries caused by penetrating objects such as nails, pointed weapons and the like. One area where a great need exists for protection against penetrating nails is footwear for people who work on construction sites, where inter alia construction timber with projecting nails is found. Treading on a nail can give rise to serious foot injuries and infections.

It has long been known to use inserts made of steel or metal in footwear for construction workers. Such metal inserts can provide good protection but have certain disadvantages. Among other things, they contribute to making the shoe relatively rigid and stiff. This prevents normal bending of the foot and impairs the sense of feeling against the ground, which can increase the risk of inter alia falling and slipping accidents.

In order to overcome some of these problems, U.S. Pat. No. 1,701,611 describes footwear with a flexible metal insert which comprises a woven metal wire fabric. However, the use of metal also results in other disadvantages, as metals are usually good conductors of both heat and electricity. Shoes with metal inserts therefore impair the possibility of keeping the foot warm in a cold climate and can, on account of their conductive capacity, constitute risks in some workplaces and for certain occupational groups such as, for example, electricians.

In order to eliminate problems associated with using metal, the use of synthetic fiber material embedded in a shoe sole has previously been proposed. In this connection, the fibers are woven into a fabric, and one or more layers of such a fabric can then be molded integrally in a shoe sole, so that the material of the shoe sole completely impregnates the woven layers. An example of a protective boot with such a sole is described in U.S. Pat. No. 5,979,081.

WO 99/13744 describes a variant of a protective boot with layers of synthetic fiber fabric integrated into the sole. In this case, the fibrous fabric is not impregnated with binder in the sole but can, for example, be fitted in a pocket formed between the inner and the outer sole of footwear.

It is common to all known protective layers using synthetic fibers with high ultimate strength that the fibers are applied in the form of a woven fabric or the like, that is to say in a structure in which the fibers are in some way arranged in a predetermined pattern relative to one another. Testing has nevertheless shown that a nail, for example, is capable of "finding its way through" any arranged fibrous structure, even if the latter consists of a very tight weave. In order to prevent this, an impractical number and thickness of woven layers would be required. This would make the shoe clumsy, and increase its weight and the consumption of expensive fibrous material.

THE OBJECT OF THE INVENTION

A main object of the present invention is to provide a flexible anti-nail protective footwear, which prevents injuries caused by pointed objects penetrating from below.

A further object of the invention is to provide such footwear, which has an improved protection and which comprises relatively thin and light flexible anti-nail protective layers.

A yet further object of the invention is to provide a flexible anti-nail protective clothing article, which prevents injuries caused by penetrating pointed objects.

A still further object of the invention is to provide a method for manufacturing a flexible anti-nail protective footwear, which prevents injuries caused by pointed objects penetrating from below.

A still further object of the invention is to provide a method for manufacturing a flexible anti-nail protective clothing article, which prevents injuries caused by pointed objects penetrating from.

According to one aspect of the invention there is provided a flexible anti-nail protective footwear, which prevents injuries caused by pointed objects penetrating from below, comprising an upper part which is open at its upper portion and closed at its lower portion, a flexible outsole attached to the upper part, and a flexible anti-nail protective layer comprising a felted layer of polymer fibers, in which felted layer the polymer fibers are present in a non-woven condition, wherein the flexible anti-nail protective layer is arranged in between the upper part and the flexible outsole or within the flexible outsole, and the flexible anti-nail protective layer is partly or completely impregnated with material of the flexible outsole, so that the material fixes positions of polymer fibers comprised in the flexible anti-nail protective layer.

According to another aspect of the invention there is provided a flexible anti-nail protective footwear, which prevents injuries caused by pointed objects penetrating from below, comprising an upper part which is closed at its lower portion, a flexible outsole attached to the upper part, and a flexible anti-nail protective layer comprising a manageable felted layer of polymer fibers, in which felted layer the polymer fibers are present in an unarranged state in relation to one another, wherein the flexible anti-nail protective layer is embedded in a hardenable binder, and the flexible anti-nail protective layer is completely impregnated with material of the flexible outsole, so that the material fixes positions of the polymer fibers comprised in the flexible anti-nail protective layer. The fibers may be made of a synthetic material with high ultimate strength, which fibers are not woven or otherwise joined together so that they will not form a regular structure before they are embedded in the binder.

In this connection, according to an embodiment of the present invention, the particularly characteristic feature of a method is that the fibers are embedded in the binder in an unarranged state in relation to one another.

The protective layer will therefore consist of a binder layer reinforced with fibers which are located close together and are fixed in random positions relative to one another. Such a layer with randomly oriented fibers has been found to have very great resistance to penetration and to constitute extraordinarily good protection against penetrating objects such as nails, pointed weapons and the like. This is believed to hold true particularly when all or some of the fibers are fixed relative one another by the impregnating binder layer.

It is preferable for the fibers to be felted together to form a manageable product before they are embedded in the binder. This facilitates handling of the fibers and thus the manufacture of the protective layer without the fibers having to be structured as in a woven fabric or the like.

In an especially preferred method according to the invention, use is made of a high-molecular polyethylene fiber sold under the trademark DYNEEMA® which, as a consequence of its properties, inter alia a very high ultimate strength and great rigidity, has been found to afford extraordinarily good protection against penetration when, for example, fibers made of this material are molded integrally, in an unarranged state, in a shoe sole, suitably made of polyurethane.

According to yet another aspect of the invention there is provided a flexible anti-nail protective clothing article, which prevents injuries caused by penetrating pointed objects, comprising a flexible anti-nail protective layer comprising a felted layer of polymer fibers, in which felted layer the polymer fibers are present in a non-woven condition, wherein the flexible anti-nail protective layer is arranged in between an inner layer of the clothing article and an outer layer of the clothing article or is embedded within a single layer of the clothing article, and the flexible anti-nail protective layer is partly or completely impregnated with material of the inner layer or the single layer, so that the material fixes positions of polymer fibers comprised in the flexible anti-nail protective layer.

According to still another aspect of the invention there is provided a flexible anti-nail protective clothing article, which prevents injuries caused by penetrating pointed objects, comprising a flexible anti-nail protective layer comprising a manageable felted layer of polymer fibers, in which felted layer the polymer fibers are present in an unarranged state in relation to one another, and a hardenable binder in which the flexible anti-nail protective layer is embedded, wherein the flexible anti-nail protective layer is completely impregnated with material of the hardenable binder, so that the material fixes positions of the polymer fibers comprised in the flexible anti-nail protective layer.

According to yet another aspect of the invention there is provided a method for manufacturing a flexible anti-nail protective footwear, which prevents injuries caused by pointed objects penetrating from below, comprising the steps of: providing an upper part which is closed at its lower portion, fixing a flexible anti-nail protective layer comprising a felted layer of polymer fibers, in which felted layer the polymer fibers are present in a non-woven condition, at the under side of the lower portion of the upper part, and molding a flexible outsole to the upper part so that the flexible outsole at least partly surrounds the flexible anti-nail protective layer and so that the flexible anti-nail protective layer is partly or completely impregnated with material of the flexible outsole, so that the material fixes positions of polymer fibers comprised in the flexible anti-nail protective layer.

According to still another aspect of the invention there is provided a protective footwear, which prevents injuries caused by pointed objects penetrating from below, comprising the step of: molding a flexible anti-nail protective layer comprising a felted layer of polymer fibers, in which felted layer the polymer fibers are present in a non-woven condition, into a loose or fixed insole of the footwear, wherein the flexible anti-nail protective layer is partly or completely impregnated with material of the insole, so that the material fixes positions of polymer fibers comprised in the flexible anti-nail protective layer.

According to yet another aspect of the invention there is provided a method in the manufacturing of a flexible anti-nail protective footwear, which prevents injuries caused by pointed objects penetrating from below, comprising the steps of: providing an upper part which is closed at its lower portion, providing a flexible anti-nail protective layer comprising a manageable felted layer of polymer fibers, in which felted layer the polymer fibers are present in an unarranged state in relation to one another, and embedding the flexible anti-nail protective layer in a hardenable binder of the footwear, wherein the flexible anti-nail protective layer is partly or completely impregnated with material of the hardenable binder, so that the material fixes positions of the polymer fibers comprised in the flexible anti-nail protective layer, and the hardenable binder, which embeds the flexible anti-nail protective layer, is fixed to the upper part.

According to still another aspect of the invention there is provided a method in the manufacturing of a flexible anti-nail protective clothing article, which prevents injuries caused by penetrating pointed objects, comprising: providing a flexible anti-nail protective layer comprising a felted layer of polymer fibers, in which felted layer the polymer fibers are present in a non-woven condition, and arranging the flexible anti-nail protective layer in between an inner layer of the clothing article and an outer layer of the clothing article or embedding the flexible anti-nail protective layer within a single layer of the clothing article, wherein the flexible anti-nail protective layer is partly or completely impregnated with material of the inner layer or the single layer, so that the material fixes positions of polymer fibers comprised in the flexible anti-nail protective layer.

According to yet another aspect of the invention there is provided a method in the manufacturing of a flexible anti-nail protective clothing article, which prevents injuries caused by penetrating pointed objects, comprising: providing a flexible anti-nail protective layer comprising a manageable felted layer of polymer fibers, in which felted layer the polymer fibers are present in an unarranged state in relation to one another, and embedding the flexible anti-nail protective layer in a hardenable binder, wherein the flexible anti-nail protective layer is completely impregnated with material of the hardenable binder, so that the material fixes positions of the polymer fibers comprised in the flexible anti-nail protective layer.

According to still another aspect of the invention there is provided a method for manufacturing a flexible anti-nail protective footwear, which prevents injuries caused by pointed objects penetrating from below, comprising the steps of: providing an upper part which is closed at its lower portion, fixing a flexible anti-nail protective layer comprising a felted layer of polymer fibers, in which felted layer the polymer fibers are present in a non-woven condition, at the under side of the lower portion of the upper part, providing a barrier layer at the under side of the flexible anti-nail protective layer, and molding a flexible outsole to the upper part so that the flexible outsole at least partly surrounds the flexible anti-nail protective layer, wherein the barrier layer prevents the material of the flexible outsole from entering the flexible anti-nail protective layer.

The invention will be described in greater detail below with reference to the illustrative embodiments shown by way of example in the accompanying drawing.

DETAILED DESCRIPTION OF THE PREFERRED EMBODIMENTS

Figure 1:
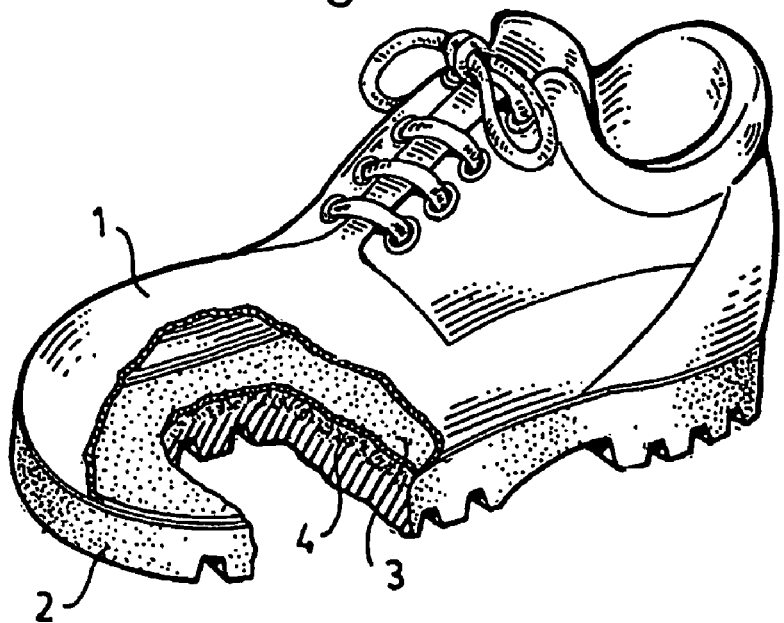
FIG. 1 illustrates a shoe made with a sole having a protective layer according to the invention.
Figure 2:
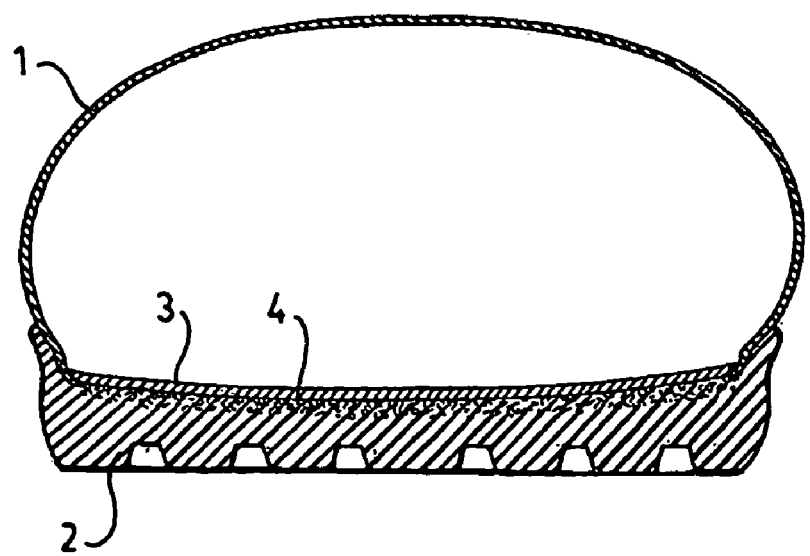
FIG. 2 is a cross section through the shoe according to FIG. 1.

FIGS. 1 and 2 show a protective shoe according to an embodiment of the invention with an upper part 1 which is open at its upper portion and closed at its lower portion, and which, if desired, can be made with a protective cap (not shown) of conventional type. Reference number 2 indicates a flexible outsole, suitably made of polyurethane, and reference number 3 an insole made of a comfort-improving material.

The designation 4 indicates a flexible anti-nail protective layer arranged in between the upper part 1 and the flexible outsole 2 or within the flexible outsole 2. The flexible anti-nail protective layer protective layer 4 may be in physical contact with the upper part 1. The layer 4 is provided for protection against penetration by nails or other sharp, penetrating objects when trodden on.

Figure 3:
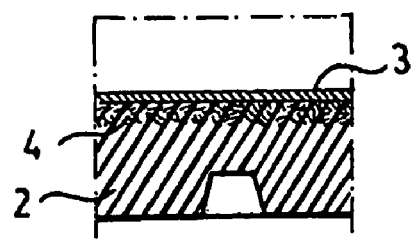
FIG. 3 is an enlarged part of FIG. 2.

This layer 4 consists of a fibrous material which is preferably molded integrally in the polyurethane material of the outsole 2, so that the fibers in the layer 4 maintain the relative positions they adopted in connection with the molding process. The fibrous material is therefore partly or completely impregnated with the polyurethane material of the sole, so that this material partly or completely surrounds at least some of the fibers and fixes their positions and directions relative to one another (in FIG. 1 the fibrous material is partly impregnated with the polyurethane material, whereas in FIGS. 2 and 3 the fibrous material is completely impregnated with the polyurethane material). Thus, the flexible outsole is at least partly extending into the flexible anti-nail protective layer. As can be seen the impregnation is made at least of an entire surface layer of the layer 4 as seen from below.

In an alternative embodiment, a barrier layer (not illustrated) is provided for preventing the material of the flexible outsole 2 from entering the flexible anti-nail protective layer 4.

According to the invention, the fibers in the layer 4 are arranged randomly in relation to one another, so that they do not form an arranged fibrous structure like a woven fabric or equivalent.

In order to produce a manageable product made of such randomly oriented fibers, which can be inserted into the mold in which the outsole is molded during shoe manufacture, the fibers can be felted together. Felting means that the fibers become hooked together and attached to one another in a non-woven condition without forming a regular pattern. Such a felted or tangled layer can, even if it is thin, be handled as a unit during the procedure for manufacturing the sole. Other methods of holding the fibers together without them being structured but which facilitate their handling can also be used. The important feature is that the fibers are in "chaos", that is to say in an entirely unarranged state.

The fibers can, for example, be felted together to form layers with a weight per unit area of roughly 500 g/m². During manufacture of the sole, it is then suitable for two layers to be arranged one on another. Depending on the thickness, it is also possible to use a single layer or more than two layers. The single or multiple layer may have a density of between about 200 g/m² and about 1200 g/m², and more preferably between about 400 g/m² and about 1000 g/m².

According to the invention, it is preferable to use fibers made of a high-molecular polyethylene material which is marketed under the tradename DYNEEMA®. Other fibrous materials with equivalent properties can also be used. The invention also includes the use of new fibers with improved values which may be developed in the future.

What makes fibers made of DYNEEMA® especially suitable is inter alia their high ultimate strength and great rigidity, which properties together afford very good protection against penetrating objects. A suitable fiber quality is DETEX 2.2.

According to the above, the invention aims primarily to provide a means of protection against penetrating objects of the type indicated above, such as nails, pointed weapons and the like, which have a relatively low speed in comparison with projectiles, such as bullets.

The felted layer of polymer fibers may comprises fibers having anti-static properties, such as carbon fibers.

The felted layer of polymer fibers may comprise fibers of a linear density of fiber mass of between about 0.5 and 5 denier, and/or fibers of different linear densities of fiber mass.

The felted layer of polymer fibers may comprise fibers of lengths between about 20 mm and 100 mm.

The invention has been described above in connection with the protective shoe shown in the figures, in which a protective layer is molded integrally in the outsole. As an alternative to this, the protective layer can also be molded integrally in a loose insole or in the fixed insole.

The protective layer according to the invention is also suitable for producing, for example, flexible protective jackets and protective trousers which provide protection against, for example, stabbing with a knife. In this context, the possibility of producing a flexible protective layer is of the greatest importance. This is achieved owing to the fact that a protective layer according to the invention can be made thin and contains flexible fibers. The binder is then selected depending on application and can consist of, apart from polyurethane, other polymeric elastomers.

Thus, a flexible anti-nail protective clothing article, which prevents injuries caused by penetrating pointed objects, comprises a flexible anti-nail protective layer comprising a felted layer of polymer fibers, in which felted layer the polymer fibers are present in a non-woven condition, wherein the flexible anti-nail protective layer is arranged in between an inner layer of the clothing article and an outer layer of the clothing article or is embedded within a single layer of the clothing article, and the flexible anti-nail protective layer is partly or completely impregnated with material of the inner layer or the single layer, so that the material fixes positions of polymer fibers comprised in the flexible anti-nail protective layer.

Alternatively, the flexible anti-nail protective clothing article, which prevents injuries caused by penetrating pointed objects, comprises a flexible anti-nail protective layer comprising a manageable felted layer of polymer fibers, in which felted layer the polymer fibers are present in an unarranged state in relation to one another, and a hardenable binder in which the flexible anti-nail protective layer is embedded, wherein the flexible anti-nail protective layer is completely impregnated with material of the hardenable binder, so that the material fixes positions of the polymer fibers comprised in the flexible anti-nail protective layer. The hardenable binder may surround the polymer fibers, and, in a hardened state, fixes the polymer fibers in their positions relative one another.

Note that the above products, while still being flexible and light weight, provide an excellent anti-nail protection function without the need of a woven fiber material. In fact many of the products of the invention may be entirely free from any kind of woven material, at least with regard to the ant-nail properties. Of course, the upper part of the footwear may be of a woven material.

The various products described above may be manufactured in a plurality of manners according to the invention.

According to one method a flexible anti-nail protective footwear is manufactured by providing the upper part 1 which is closed at its lower portion, fixing the flexible anti-nail protective layer 4 comprising the felted layer of polymer fibers, in which felted layer the polymer fibers are present in the non-woven condition, at the under side of the lower portion of the upper part 1, and molding the flexible outsole 2 to the upper part 1 so that the flexible outsole 2 at least partly surrounds the flexible anti-nail protective layer 4 and so that the flexible anti-nail protective layer is partly or completely impregnated with material of the flexible outsole, so that the material fixes positions of polymer fibers comprised in the flexible anti-nail protective layer.

According to another method a flexible anti-nail protective footwear is manufactured by molding the flexible anti-nail protective layer 4 comprising the felted layer of polymer fibers, in which felted layer the polymer fibers are present in the non-woven condition, into the loose or fixed insole 3 of the footwear, wherein the flexible anti-nail protective layer 4 is partly or completely impregnated with material of the insole 3, so that the material fixes positions of polymer fibers comprised in the flexible anti-nail protective layer 4.

According to yet another method a flexible anti-nail protective footwear is manufactured by providing the upper part 1 which is closed at its lower portion, providing the flexible anti-nail protective layer 4 comprising the manageable felted layer of polymer fibers, in which felted layer the polymer fibers are present in an unarranged state in relation to one another, and embedding the flexible anti-nail protective layer 4 in the hardenable binder 2 of the footwear, wherein the flexible anti-nail protective layer 4 is partly or completely impregnated with material of the hardenable binder 2, so that the material fixes positions of the polymer fibers comprised in the flexible anti-nail protective layer 4, and the hardenable binder 2, which embeds the flexible anti-nail protective layer, is fixed to the upper part 1.

According to still another method a flexible anti-nail protective footwear is manufactured by providing the upper part 1 which is closed at its lower portion, fixing the flexible anti-nail protective layer 4 comprising the felted layer of polymer fibers, in which felted layer the polymer fibers are present in the non-woven condition, at the under side of the lower portion of the upper part 1, providing the barrier layer (not illustrated) at the under side of the flexible anti-nail protective layer 4, and molding the flexible outsole 2 to the upper part 1 so that the flexible outsole 2 at least partly surrounds the flexible anti-nail protective layer 4, wherein the barrier layer prevents the material of the flexible outsole 2 from entering the flexible anti-nail protective layer.

According to still other methods the above methods are, mutatis mutandis, provided for the manufacturing a flexible anti-nail protective clothing article in general.

What is claimed is:

1. A flexible anti-nail protective footwear, which prevents injuries caused by pointed objects penetrating from below, comprising:
   an upper part which is open at its upper portion and closed at its lower portion;
   a flexible outsole attached to the upper part; and
   a flexible anti-nail protective felted layer of polymer fibers, in which the polymer fibers are present in a non-woven condition, wherein
   the flexible anti-nail protective felted layer is arranged in between said upper part and said flexible outsole or within said flexible outsole; and
   the flexible anti-nail felted protective layer is partly or completely impregnated with material of said flexible outsole, so that said material fixes positions of polymer fibers comprised in the flexible anti-nail protective felted layer.

2. The footwear of claim 1 wherein said flexible anti-nail protective felted layer comprises polyethylene fibers or other fibrous material with equivalent properties.

3. The footwear of claim 1 wherein said flexible anti-nail protective felted layer comprises high-molecular polyethylene material having high ultimate strength and great rigidity.

4. The footwear of claim 1 wherein said felted layer of polymer fibers comprises fibers having anti-static properties.

5. The footwear of claim 4 wherein said fibers having anti-static properties are carbon fibers.

6. The footwear of claim 1 wherein said felted layer of polymer fibers comprises fibers of a linear density of fiber mass of between about 0.5 and 5 denier.

7. The footwear of claim 1 wherein said felted layer of polymer fibers comprises fibers of different linear densities of fiber mass.

8. The footwear of claim 1 wherein said felted layer of polymer fibers comprises fibers of lengths between about 20 mm and 100 mm.

9. The footwear of claim 1 comprising two or more felted layers of polymer fibers.

10. The footwear of claim 1 wherein said flexible anti-nail protective layer has a density of between about 200 $g/m^2$ and about 1200 $g/m^2$.

11. The footwear of claim 1 wherein said flexible anti-nail protective felted layer has a density of between about 400 $g/m^2$ and about 1000 $g/m^2$.

12. The footwear of claim 1 wherein said flexible anti-nail protective felted layer is molded integrally in said flexible outsole.

13. The footwear of claim 1 wherein said flexible anti-nail protective felted layer is embedded in said flexible outsole.

14. The footwear of claim 1 wherein said flexible anti-nail protective felted layer is in physical contact with said upper part.

15. The footwear of claim 1 wherein said flexible outsole is partly extending into said flexible anti-nail protective felted layer.

16. The footwear of claim 1 wherein the entire flexible anti-nail protective felted layer is partly or completely impregnated with material of said flexible outsole from below, so that said material fixes positions of polymer fibers comprised in the flexible anti-nail protective felted layer.

17. The footwear of claim 1 wherein said flexible anti-nail protective felted layer is molded integrally in a loose or fixed insole of said footwear.

18. The footwear of claim 1 wherein the lower portion of said upper part comprises an insole.

19. The footwear of claim 1 wherein the outsole is made of polyurethane.

20. A flexible anti-nail protective footwear, which prevents injuries caused by pointed objects penetrating from below, comprising:
   an upper part which is closed at its lower portion;
   a flexible outsole attached to the upper part; and a flexible anti-nail protective layer comprising a manageable felted layer of polymer fibers, in which felted layer the polymer fibers are present in an unarranged state in relation to one another, wherein the flexible anti-nail protective layer is embedded in a hardenable binder; and the flexible anti-nail protective layer is completely impregnated with material of said flexible outsole, so that said material fixes positions of the polymer fibers comprised in the flexible anti-nail protective layer.

21. The footwear of claim 20 wherein said hardenable binder surrounds the polymer fibers.

22. The footwear of claim 20 wherein said hardenable binder, in a hardened state, fixes the polymer fibers in their positions relative one another.

23. The footwear of claim 20 wherein said hardenable binder forms said flexible outsole.

24. A flexible anti-nail protective clothing article, which prevents injuries caused by penetrating pointed objects, comprising:

a flexible anti-nail protective felted layer comprising polymer fibers, in which layer the polymer fibers are present in a non-woven condition, wherein the flexible anti-nail protective layer is arranged in between an inner layer of said clothing article and an outer layer of said clothing article or is embedded within a single layer of said clothing article; and the flexible anti-nail protective felted layer is partly or completely impregnated with material of said inner layer or said single layer, so that said material fixes positions of polymer fibers comprised in the flexible anti-nail protective felted layer.

25. A method for manufacturing a flexible anti-nail protective footwear, which prevents injuries caused by pointed objects penetrating from below, comprising the steps of:

providing an upper part which is closed at its lower portion;

fixing a flexible anti-nail protective felted layer of polymer fibers, in which the polymer fibers are present in a non-woven condition, at the under side of the lower portion of said upper part; and molding a flexible outsole to the upper part so that the flexible outsole at least partly surrounds said flexible anti-nail protective felted layer and so that the flexible anti-nail protective felted layer is partly or completely impregnated with material of said flexible outsole, so that said material fixes positions of polymer fibers comprised in the flexible anti-nail protective felted layer.

26. The method of claim 25 wherein the material of the flexible outsole at least partly impregnates the entire surface layer of the flexible anti-nail protective felted layer from below during said molding.

27. The method of claim 25 wherein said flexible anti-nail protective felted layer is embedded in material of said flexible outsole.

28. The method of claim 25 wherein said flexible outsole fixes, in a hardened state, the polymer fibers in their positions relative one another.

* * * * *